US009426040B2

(12) United States Patent
Vasseur et al.

(10) Patent No.: US 9,426,040 B2
(45) Date of Patent: Aug. 23, 2016

(54) MIXED DISTRIBUTED/CENTRALIZED ROUTING TECHNIQUES BASED ON CLOSED-LOOP FEEDBACK FROM A LEARNING MACHINE TO AVOID DARK ZONES

(71) Applicant: Cisco Technology, Inc., San Jose, CA (US)

(72) Inventors: Jean-Philippe Vasseur, Saint Martin d'Uriage (FR); Grégory Mermoud, Veyras (CH); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 215 days.

(21) Appl. No.: 14/164,469

(22) Filed: Jan. 27, 2014

(65) Prior Publication Data

US 2015/0195126 A1    Jul. 9, 2015

Related U.S. Application Data

(60) Provisional application No. 61/923,910, filed on Jan. 6, 2014.

(51) Int. Cl.
| | |
|---|---|
| *H04L 12/24* | (2006.01) |
| *H04L 12/805* | (2013.01) |
| *H04W 24/02* | (2009.01) |
| *H04L 12/751* | (2013.01) |
| *H04L 12/803* | (2013.01) |
| *H04L 12/26* | (2006.01) |

(Continued)

(52) U.S. Cl.
CPC .......... *H04L 41/5025* (2013.01); *H04L 45/02* (2013.01); *H04L 47/122* (2013.01); *H04L 47/365* (2013.01); *H04W 24/02* (2013.01); *H04L 43/0852* (2013.01); *H04L 45/70* (2013.01); *H04W 24/04* (2013.01)

(58) Field of Classification Search
None
See application file for complete search history.

(56) References Cited

U.S. PATENT DOCUMENTS

| 6,577,597 B1 | 6/2003 | Natarajan et al. |
| 6,694,471 B1 | 2/2004 | Sharp |

(Continued)

OTHER PUBLICATIONS

Fan, N., "Learning Nonlinear Distance Functions Using Neural Network for Regression with Application to Robust Human Age Estimation", IEEE International Conference on Computer Vision (ICCV), Nov. 2011, pp. 249-254, Institute of Electrical and Electronics Engineers, Barcelona, Spain.

(Continued)

*Primary Examiner* — Hassan Kizou
*Assistant Examiner* — Tejis Daya
(74) *Attorney, Agent, or Firm* — Parker Ibrahim & Berg LLC; James M. Behmke; Stephen D. LeBarron

(57) ABSTRACT

In one embodiment, a routing topology of a network including nodes interconnected by communication links is determined, and activity in the network is monitored to determine a normal behavior of the communication links. Weak communication links in the network that deviate from the determined normal behavior are detected, and it is then determined whether the weak communication links are spatially correlated based on the determined topology of the network. In response to the weak communication links being spatially correlated, a region of the network affected by the weak communication links is identified as a dark zone that is to be avoided when routing data packets in the network.

21 Claims, 8 Drawing Sheets

(51) Int. Cl.
     *H04W 24/04*     (2009.01)
     *H04L 12/721*    (2013.01)

(56) References Cited

U.S. PATENT DOCUMENTS

| | | | |
|---|---|---|---|
| 6,697,325 B1* | 2/2004 | Cain .................... | H04L 45/02 |
| | | | 370/217 |
| 6,721,899 B1* | 4/2004 | Narvaez-Guarnieri . | H04L 45/02 |
| | | | 370/218 |
| 6,769,024 B1 | 7/2004 | Natarajan et al. | |
| 6,785,239 B1 | 8/2004 | Tasker | |
| 6,886,040 B1 | 4/2005 | Fitzgerald | |
| 6,961,573 B1 | 11/2005 | Moon et al. | |
| 6,973,034 B1 | 12/2005 | Natarajan et al. | |
| 7,092,410 B2 | 8/2006 | Bordonaro et al. | |
| 7,457,877 B1 | 11/2008 | Shah et al. | |
| 7,496,650 B1* | 2/2009 | Previdi ................ | H04L 45/028 |
| | | | 370/229 |
| 7,568,045 B1 | 7/2009 | Agrawal | |
| 7,606,895 B1 | 10/2009 | Dini et al. | |
| 7,613,128 B2 | 11/2009 | Castagnoli et al. | |
| 7,680,047 B2 | 3/2010 | Vadlakonda et al. | |
| 7,724,676 B2 | 5/2010 | Gerstel et al. | |
| 7,948,910 B2 | 5/2011 | Arbel et al. | |
| 8,005,000 B1 | 8/2011 | Srinivasan | |
| 8,369,213 B2 | 2/2013 | Vasseur et al. | |
| 8,385,355 B1* | 2/2013 | Figueira ............. | H04L 12/4625 |
| | | | 370/386 |
| 8,605,591 B2 | 12/2013 | Shaffer et al. | |
| 8,630,177 B2 | 1/2014 | Vasseur et al. | |
| 8,630,291 B2 | 1/2014 | Shaffer et al. | |
| 8,634,314 B2 | 1/2014 | Banka et al. | |
| 8,638,778 B2 | 1/2014 | Lee et al. | |
| 8,942,085 B1* | 1/2015 | Pani .................... | H04L 45/02 |
| | | | 370/225 |
| 2002/0061001 A1* | 5/2002 | Garcia-Luna-Aceves | H04W 40/30 |
| | | | 370/338 |
| 2002/0105904 A1* | 8/2002 | Hauser ................ | H04L 41/0663 |
| | | | 370/218 |
| 2003/0061340 A1* | 3/2003 | Sun .................... | H04L 12/2602 |
| | | | 709/224 |
| 2003/0133417 A1* | 7/2003 | Badt, Jr. ............. | G06F 11/2289 |
| | | | 370/254 |
| 2004/0218525 A1* | 11/2004 | Elie-Dit-Cosaque | H04L 41/0631 |
| | | | 370/223 |
| 2006/0140111 A1* | 6/2006 | Vasseur ................ | H04L 45/02 |
| | | | 370/216 |
| 2007/0183317 A1* | 8/2007 | Vasseur ................ | H04J 3/14 |
| | | | 370/225 |
| 2008/0049622 A1* | 2/2008 | Previdi ............... | H04L 12/2602 |
| | | | 370/237 |
| 2008/0089246 A1* | 4/2008 | Ghanwani ........... | H04L 12/462 |
| | | | 370/256 |
| 2008/0159151 A1* | 7/2008 | Datz .................... | H04L 45/00 |
| | | | 370/238 |
| 2008/0192651 A1* | 8/2008 | Gibbings ............ | H04L 41/12 |
| | | | 370/254 |
| 2009/0019147 A1 | 1/2009 | Ahlers et al. | |
| 2009/0073988 A1* | 3/2009 | Ghodrat .............. | H04L 1/22 |
| | | | 370/395.53 |
| 2009/0129316 A1* | 5/2009 | Ramanathan ........ | H04L 45/123 |
| | | | 370/328 |
| 2009/0147714 A1* | 6/2009 | Jain .................... | H04W 52/0216 |
| | | | 370/311 |
| 2009/0168653 A1* | 7/2009 | St. Pierre ............ | H04L 45/00 |
| | | | 370/238 |
| 2009/0271467 A1* | 10/2009 | Boers ................. | H04L 45/02 |
| | | | 709/201 |
| 2011/0085461 A1 | 4/2011 | Liu et al. | |
| 2011/0116389 A1* | 5/2011 | Tao .................... | H04L 45/18 |
| | | | 370/252 |
| 2011/0228696 A1* | 9/2011 | Agarwal .............. | H04L 41/12 |
| | | | 370/253 |
| 2011/0231573 A1* | 9/2011 | Vasseur ............... | H04L 45/48 |
| | | | 709/238 |
| 2011/0267962 A1* | 11/2011 | J S A .................. | H04L 41/147 |
| | | | 370/242 |
| 2012/0155475 A1* | 6/2012 | Vasseur .............. | H04L 45/028 |
| | | | 370/400 |
| 2012/0213124 A1* | 8/2012 | Vasseur ............... | H04L 41/12 |
| | | | 370/255 |
| 2012/0233308 A1 | 9/2012 | Van De Houten et al. | |
| 2012/0307629 A1* | 12/2012 | Vasseur .............. | H04L 45/34 |
| | | | 370/228 |
| 2012/0307653 A1 | 12/2012 | Vasseur et al. | |
| 2013/0022053 A1 | 1/2013 | Vasseur et al. | |
| 2013/0022083 A1 | 1/2013 | Vasseur et al. | |
| 2013/0024560 A1 | 1/2013 | Vasseur et al. | |
| 2013/0028073 A1* | 1/2013 | Tatipamula ......... | H04L 41/12 |
| | | | 370/218 |
| 2013/0028103 A1 | 1/2013 | Hui et al. | |
| 2013/0121331 A1 | 5/2013 | Vasseur et al. | |
| 2013/0128720 A1* | 5/2013 | Kim .................... | H04L 43/0817 |
| | | | 370/218 |
| 2013/0159479 A1 | 6/2013 | Vasseur | |
| 2013/0159486 A1 | 6/2013 | Vasseur | |
| 2013/0159550 A1 | 6/2013 | Vasseur | |
| 2013/0201858 A1 | 8/2013 | Varma et al. | |
| 2013/0223229 A1 | 8/2013 | Hui et al. | |
| 2013/0250754 A1* | 9/2013 | Vasseur .............. | H04W 40/023 |
| | | | 370/225 |
| 2013/0250811 A1 | 9/2013 | Vasseur et al. | |
| 2013/0336126 A1 | 12/2013 | Vasseur et al. | |
| 2013/0336316 A1 | 12/2013 | Sudhaakar et al. | |
| 2014/0003277 A1 | 1/2014 | Shim | |
| 2014/0022928 A1 | 1/2014 | Zingale et al. | |
| 2014/0092753 A1 | 4/2014 | Vasseur et al. | |
| 2014/0204759 A1* | 7/2014 | Guo .................. | H04W 28/0236 |
| | | | 370/236 |

OTHER PUBLICATIONS

Fortunato, S., "Community Detection in Graphs", arXiv:0906.0612v2.pdf [physics.soc-ph]; Physics Reports 486, 75-174, Jan. 2010, 103 pages.

Hui, et al., "An IPv6 Routing Header for Source Routes with the Routing Protocol for Low-Power and Lossy Networks (RPL)", Request for Comments 6554, Mar. 2012, 13 pages, Internet Engineering Task Force Trust.

Newman, et al., "Modularity and Community Structure in Networks", Proceedings of the National Academy of Sciences of the United States of America, Jun. 2006, vol. 103, No. 23, pp. 8577-8582, PNAS, Washington, DC.

Newman, M. E. J., "Analysis of Weighted Networks", http://arxiv.org/pdf/condmat/0407503.pdf, Phys. Rev. E 70, 056131, Jul. 2004, 9 pages.

Siddiky, et al., "An Efficient Approach to Rotation Invariant Face Detection Using PCA, Generalized Regression Neural Network and Mahalanobis Distance by Reducing Search Space", 10th International Conference on Computer and Information Technology, Dec. 2007, 6 pages, Dhaka, Bangladesh.

Ting, et al., "Variational Bayesian Least Squares: An Application to Brain-Machine Interface Data", Neural Networks, vol. 21, Issue 8, Oct. 2008, pp. 1112-1131, Elsevier.

Vasseur, et al., "Routing Metrics Used for Path Calculation in Low-Power and Lossy Networks", Request for Comments 6551, Mar. 2012, 30 pages, Internet Engineering Task Force Trust.

Vasseur, et al., "Learning-Machine-Based Predictive and Proactive Computer Networking and Associated Monitoring", U.S. Appl. No. 61/923,910, filed Jan. 6, 2014, 105 pages, U.S. Patent and Trademark Office, Alexandria, VA.

Winter, et al., "RPL: IPv6 Routing Protocol for Low-Power and Lossy Networks", Request for Comments 6550, Mar. 2012, 157 pages, Internet Engineering Task Force Trust.

\* cited by examiner

A BAYESIAN NETWORK REPRESENTING THE JOINT PROBABILITY DISTRIBUTION OVER THREE RANDOM VARIABLES; X, Y, AND Z

BN FOR LINEAR REGRESSION

MIXED DISTRIBUTED/CENTRALIZED ROUTING TECHNIQUES BASED ON CLOSED-LOOP FEEDBACK FROM A LEARNING MACHINE TO AVOID DARK ZONES

RELATED APPLICATION

This application claims priority to U.S. Provisional Application No. 61/923,910, filed Jan. 6, 2014, entitled: LEARNING-MACHINE-BASED PREDICTIVE AND PROACTIVE COMPUTER NETWORKING AND ASSOCIATED MONITORING, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
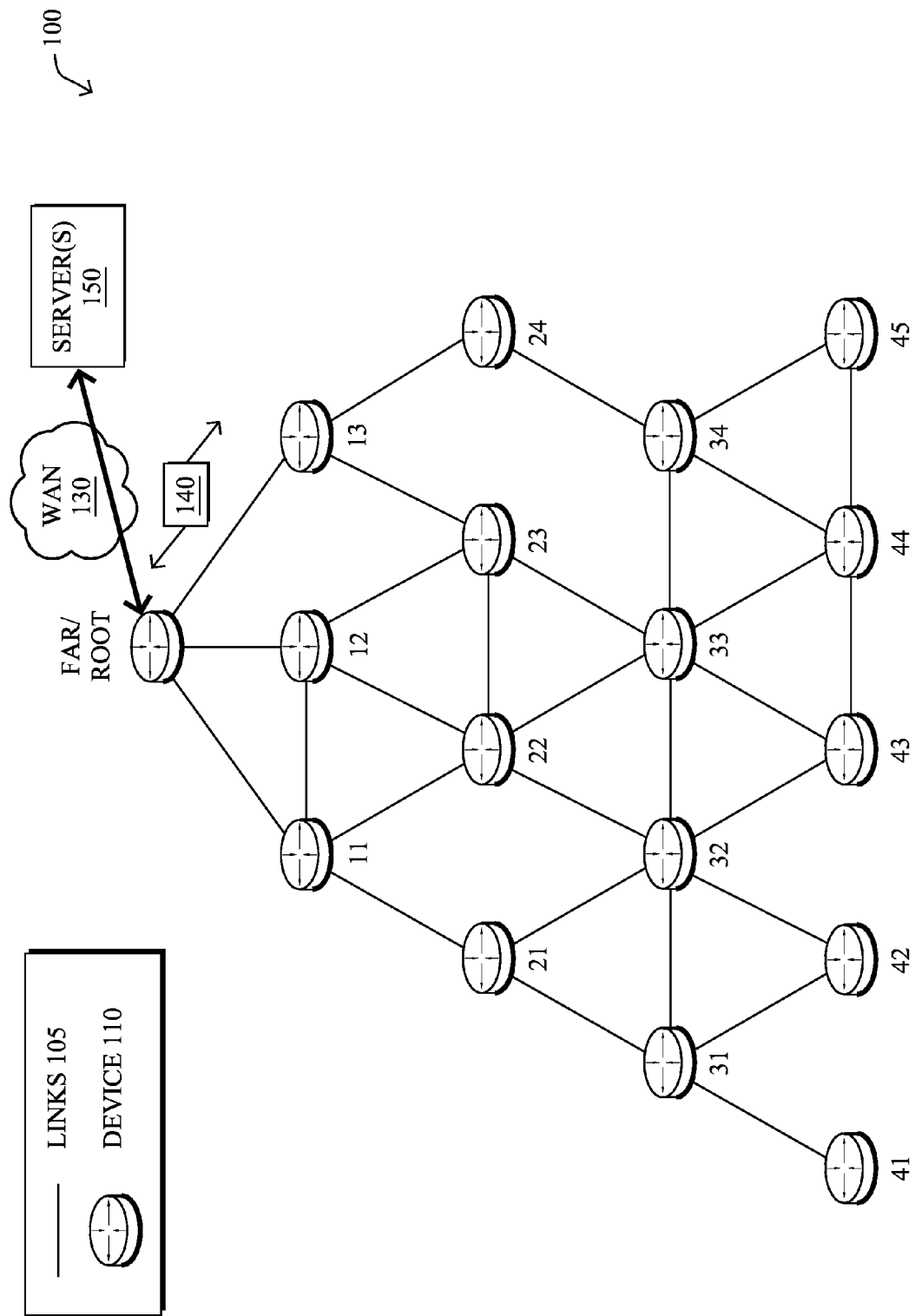
FIG. 1 illustrates an example communication network.

According to one or more embodiments of the disclosure, a routing topology of a network including nodes interconnected by communication links is determined, and activity in the network is monitored to determine a normal behavior of the communication links. Weak communication links in the network that deviate from the determined normal behavior are detected, and it is then determined whether the weak communication links are spatially correlated based on the determined topology of the network. In response to the weak communication links being spatially correlated, a region of the network affected by the weak communication links is identified as a dark zone that is to be avoided when routing data packets in the network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
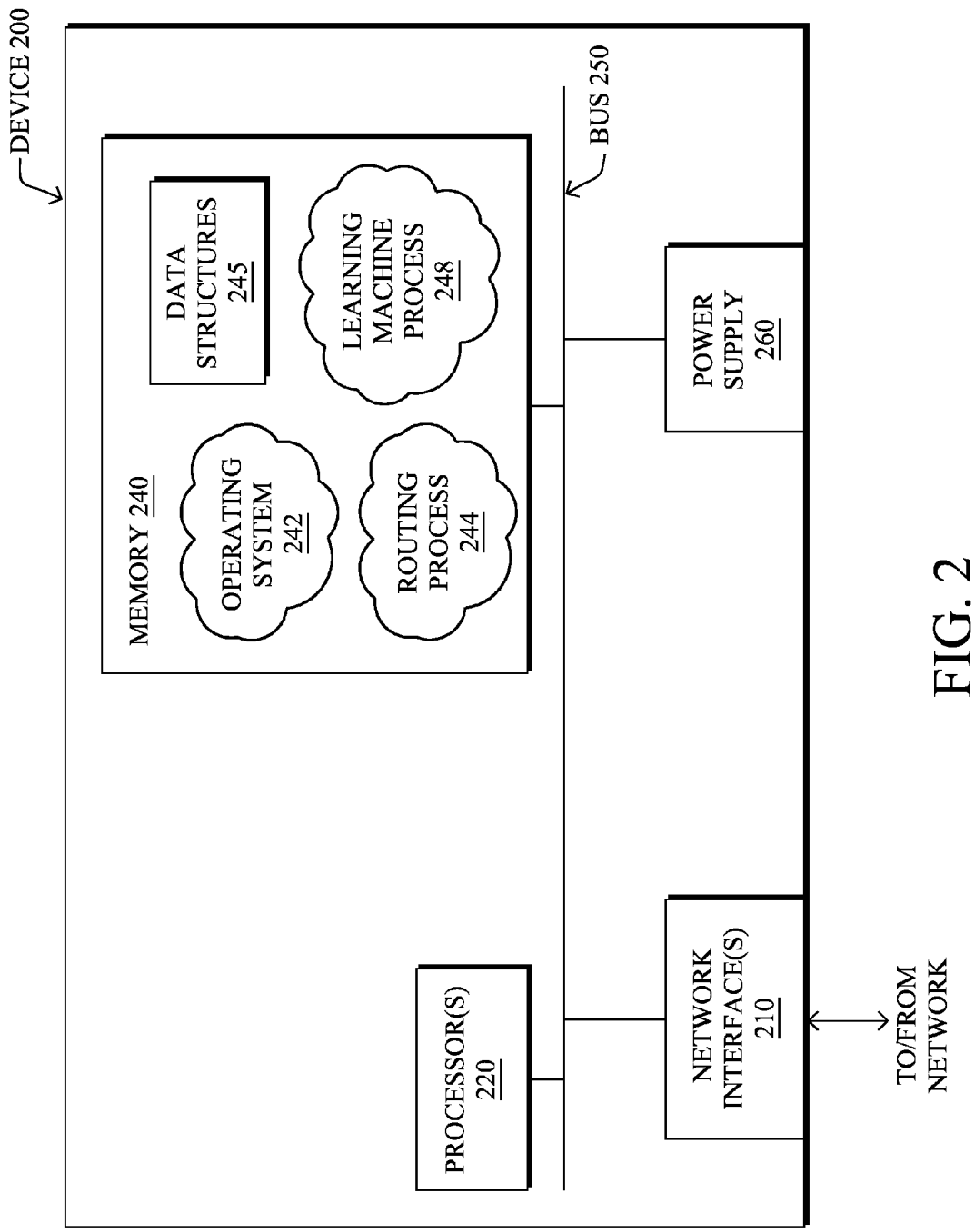
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
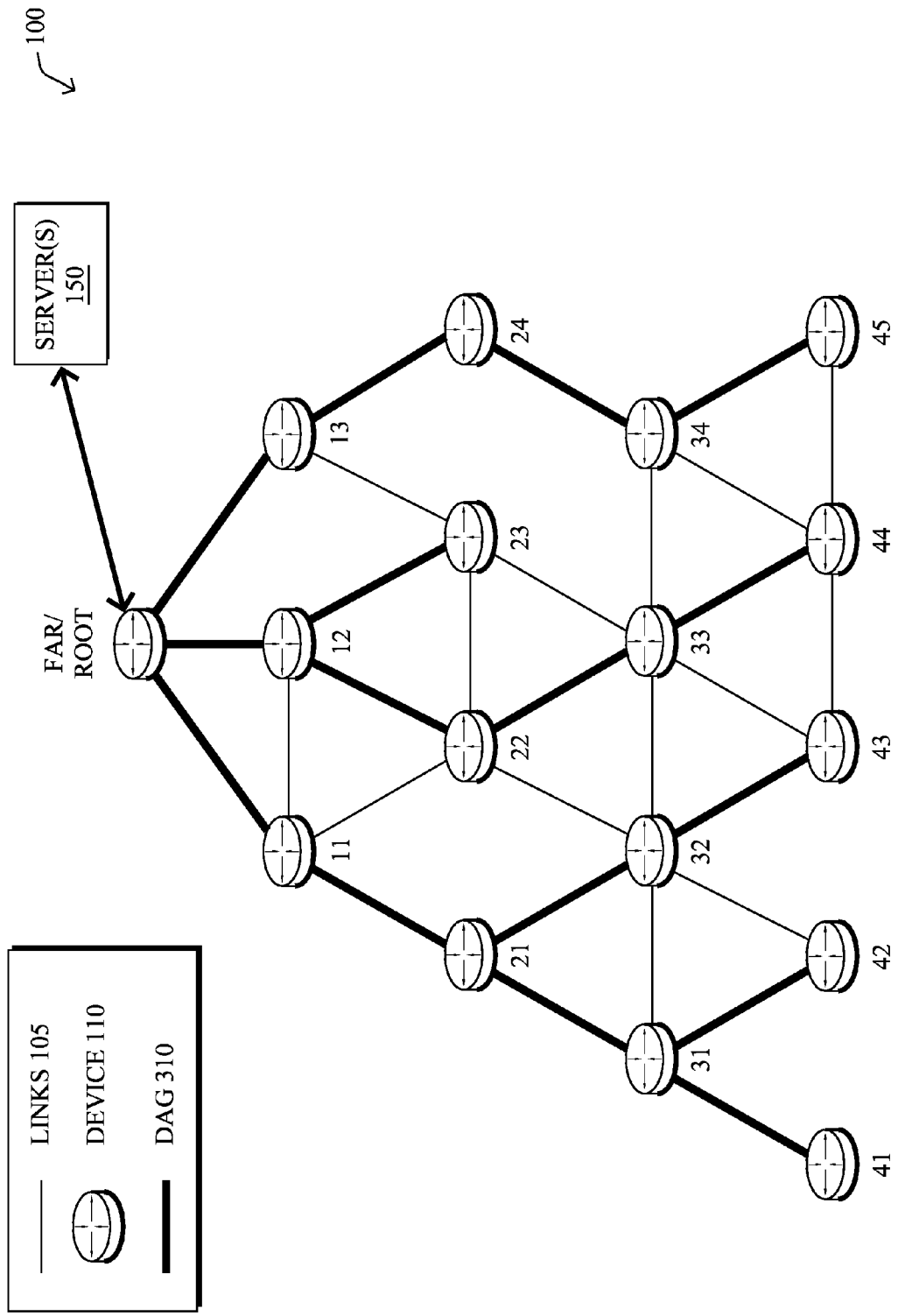
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

In particular, many LMs can be expressed in the form of a probabilistic graphical model also called Bayesian Network (BN). A BN is a graph G=(V,E) where V is the set of vertices and E is the set of edges. The vertices are random variables, e.g., X, Y, and Z (see FIG. 4) whose joint distribution P(X,Y,Z) is given by a product of conditional probabilities:

$$P(X,Y,Z)=P(Z|X,Y)\,P(Y|X)\,P(X) \quad (Eq.\ 1)$$

Figure 4:
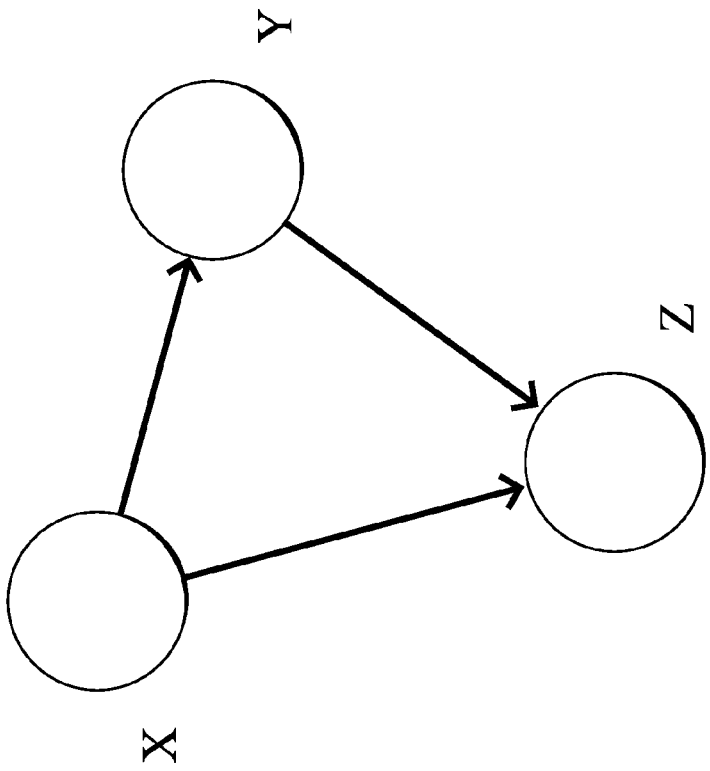
FIG. 4 illustrates an example Bayesian network.

The conditional probabilities in Eq. 1 are given by the edges of the graph in FIG. 4. In the context of LMs, BNs are used to construct the model M as well as its parameters.

To estimate the relationship between network properties of a node I (or link), noted $x_i$ (e.g., hop count, rank, firmware version, etc.) and a given networking metric $M_i$, a linear regression may be performed. More specifically, given the following equation:

$$M_i=F(x_i)=b^T x_i+\epsilon \quad (Eq.\ 2)$$

where $x_i$ is a d-dimensional vector of observed data (e.g., end-node properties such as the rank, the hop count, the distance to the FAR, etc.) and $M_i$ is the target metric (e.g., the time to join the network), which is also noted $y_i$ sometimes. Building such a model of a performance metric knowing a set of observed features is critical to perform root cause analysis, network monitoring, and configuration: for example the path delay as a function of the node rank, link quality, etc., can then be used to determine whether anomalies appear in the network and thus take some appropriate actions to fix the issue. In the equation (Eq. 2) above, the term $\epsilon$ is a Gaussian random variable used to model the uncertainty and/or the noise on the estimate M. The linear regression consists in finding the weight vector b that fulfills the maximum likelihood criterion (which coincides with the least square criterion when $\epsilon$ is Gaussian). In particular, the optimal b must minimize the Mean Squared Error (MSE):

$$MSE=\Sigma_i(b^T x_i-y_i)^2/N \quad (Eq.\ 3)$$

where N is the total number of input data points, i.e., i=1, . . . , N.

In other words, b is a set of weights for each observed value $x_i$ used to compute the function F that provides the value of F. The MSE is a metric used to compute the "quality" of the model function F.

The usual approach to the solving of Eq. (2) is the ordinary least square (OLS) equation, which involves a "d×d" matrix inversion, where d is the number of dimensions. Three main problems arise immediately: (i) the dimensionality of $x_i$ may be large, thus making OLS prohibitively expensive in terms of computational cost (approximately $O(d^3)$), (ii) in presence of co-linearity (i.e., when several node properties are strongly correlated, as it is the case for the hop count and the ETX, for instance), OLS becomes numerically unstable (i.e., round-off and truncation errors are magnified, causing the MSE to grow exponentially), (iii) OLS being essentially non-probabilistic (i.e., it doesn't account for the whole distribution of its constituent variables, but it merely tracks averages), it cannot cope well with noise and outliers, and it is simply not is applicable when $\epsilon$ is not Gaussian.

Figure 5:
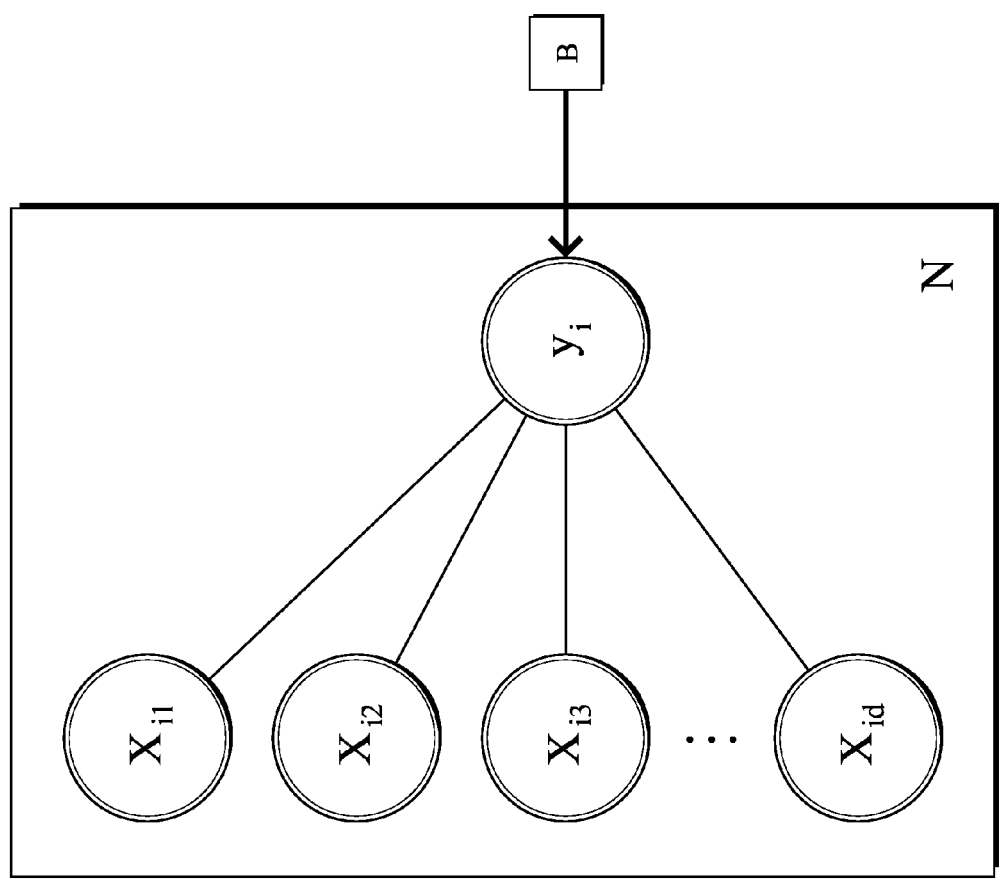
FIG. 5 illustrates an example Bayesian network for linear regression.

To overcome these limitations, the problem can be formulated as a BN (see FIG. 5). Now, all variables are considered as random variables, even though they are all observed at this point: both input variable $x_i$ and the output variable $y_i$ are experimental data, and b is a (non-probabilistic) parameter of the BN at this point. By pushing this approach a little bit further, one may turn b into a random variable as well, and attempt to infer it from experimental data (that is, the observations of $x_i$ and $y_i$). However, this inference problem is non-trivial, especially as one desirable feature of this learning algorithm is that it is capable of identifying non-relevant dimensionalities of x (that is, input dimensions that are weakly correlated with the output x), and automatically set the corresponding weights in b to a zero (or a very small) value.

This problem is solved by one recently proposed algorithm called Variational Bayes Least Square (VBLS) regression (Ting, D'Souza, Vijayakumar, & Schaal, 2010). Namely, this algorithm allows for efficient learning and feature selection in high-dimensional regression problems, while avoiding the use of expensive and numerically brittle matrix inversion. VBLS adds a series of non-observed random variables $z_{ij}$ that can be considered as noisy, fake targets of the factor $b_j \cdot x_{ij}$, and whose sum $\Sigma_j z_{ij}$ is an estimate of $y_i$. In turn, the weights $b_j$ are modeled as random variables, thereby allowing for automated feature detection, i.e., the mean of $b_j$ converges rapidly to zero if no correlation exists between the various $x_{ij}$ and $y_i$.

VBLS estimates the distribution of the non-observed variables $z_{ij}$ and b using a variant of the Expectation Maximization algorithm with a variational approximation for the posterior distributions, which are not analytically tractable. Because it is a fully Bayesian approach, VBLS does not require any parameterization, except for the initial (prior) distributions of hidden parameters, which are set in an uninformative way, i.e., with very large variances that lead to flat distributions.

Mixed Distributed/Centralized Routing Techniques Based on Closed-Loop Feedback from a Learning Machine to Avoid Dark Zones The careful analysis of a vast amount of data coming from packet traces, router logs, and NMS information gathered thanks to the lightweight CoAP resource management protocols on a real-life deployed network has shown a quite interesting space correlation between failures in the network. Although one can intuitively guess that there are areas where the network may become unstable for a number of reasons (environmental perturbations), high spatial correlation of link failures (high ETX for example) has been observed.

As of today, all distributed routing protocols such as RPL, Load-ng, ISIS, OSPF, etc. handle network failures according to local decisions using a distributed algorithm. For example, RPL would determine that link qualities fall under a specific threshold and would slowly reroute traffic, according to slow varying routing metric. In the case of other routing protocols, the decision will be based on different link-failure detection (using lower layer information, fast keep-alive such as OSPF/ISIS or BFD, etc.). In the case of LLN, RPL has been designed so that such decisions are slow to avoid over-reactions that would unavoidably lead to network oscillations in LLNs where link quality tends to vary over time according for a number of reasons. Furthermore, nodes do not have a global view of the spatial correlation, which again lead to sub-optimal or even improper decisions (this is due to the inherent distributed decision of a routing protocol such as RPL).

An aim of the techniques herein is to augment distributed routing decisions with centralized-based decision driven by a learning machine that learns the normal behavior of network elements and then detect spatial correlations of the perturbed network elements, which is called a "dark zone" herein (i.e., an area in the network where the level of perturbation is high), taking into account the network topology and dynamic (distributed) routing protocol in use. Then, the learning machine triggers local rerouting around the dark zone, still while preserving the distributed nature of the routing protocol.

Said differently, by contrast with current approaches, the techniques herein rely on the analysis of spatial correlations of weak communication links based on on-the-fly routing topology analysis and performance metric correlation in order to identify dark zones in the network, where a dark zone is composed of nodes in a neighborhood that should be avoided, e.g., an area populated with the weak communication links. A newly defined message is sent to these nodes, which in turn, set an indication in the distributed routing protocol requesting other nodes in the neighborhood to avoid them, if possible. The techniques herein allow for the combination of central intelligence performing information correlation and distributed routing in a low power and lossy networks.

Note again that current routing approaches are either totally distributed (each node makes use of a routing protocol to compute (shortest) constrained path using a routing algorithm) or central (for example, in IP/MPLS networks, a Path Computation Element (PCE) may be used to compute a set of paths with the objective of global optimization of a set of path according to specific objective function). The techniques herein propose a radically different approach: distributed routing is preserved for reasons such as scalability but a learning machine hosted on an engine (e.g., a router, SDN controller, etc.) observing traffic and network events is in charge of identifying dark zones and sends indication to some nodes to trigger local routing decision where appropriate.

Figure 6:
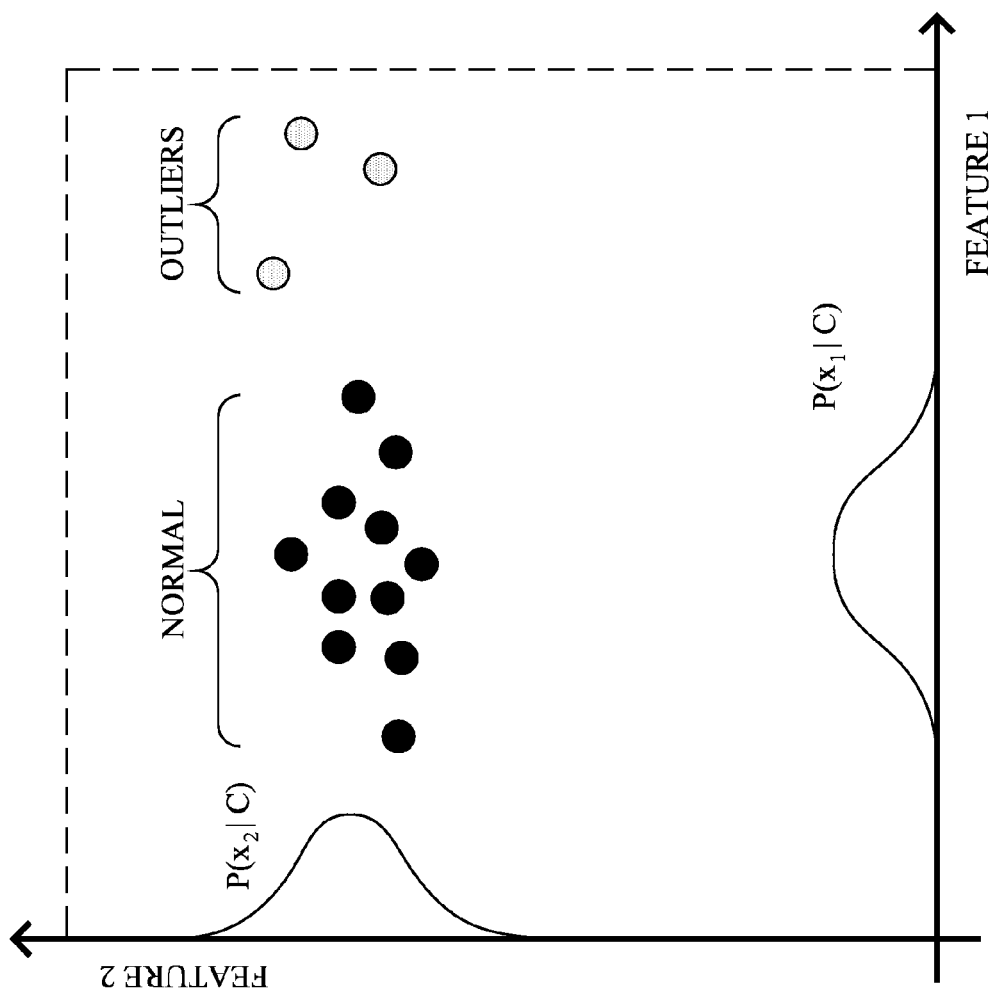
FIGS. 6-7 illustrate an example of a mixed distributed/centralized routing technique based on closed-loop feedback from a learning machine to avoid dark zones in LLNs.
Figure 7:
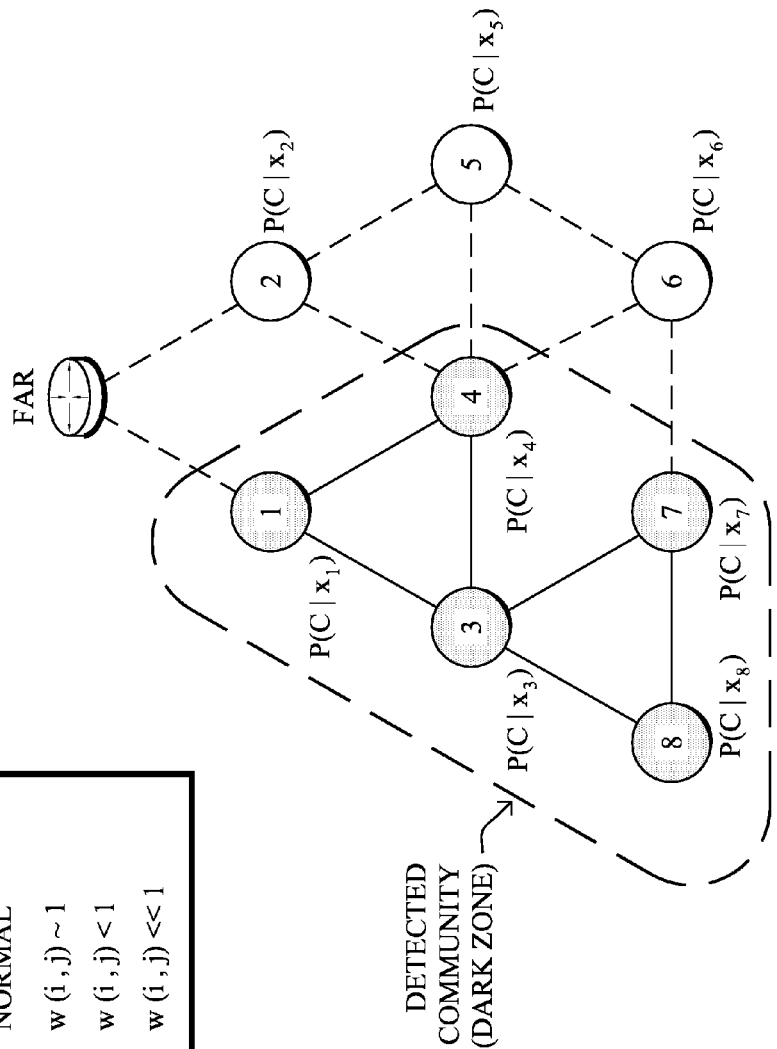

Operationally, as shown in (and with general reference to) FIGS. 6-7, the first component of the techniques herein is a Learning Machine (LM) hosted on an engine such as a router (e.g., a Field Area Router (FAR) as used herein, though other routers are eligible) connecting the Low-power and Lossy Network (LLN) to the IP core network. The aim of such an LM is to identify spatial correlations of network element failures (or weak links leading to high retransmission rates). As a result, the LM must achieve two objectives: (i) detect broken and/or weak links (which are characterized by abnormally low performance metrics), and (ii) determine if these links are somewhat clustered in space, thereby forming a so-called dark zone (which once again has been observed in the field) where very little useful communication can take place.

Because the techniques herein aim at detecting temporary perturbations of the network, the techniques herein may learn the normal behavior of its constitutive elements, and detect deviations from this normal behavior. To this end, the techniques herein monitor critical performance metrics for each link in the network, such as the link expected transmission count (ETX), the received signal strength index (RSSI), and the link quality index (LQI), and the techniques herein construct a simple statistical model of these metrics on a time-window [t, t+delta_t]. The difficulty arises from the fact that a given value of ETX, RSSI, or LQI does not, by itself, allow one to conclude if a link is suffering from perturbations. An RSSI of −60 dB may indicate a problem for a link between two nodes distant from a few tens of meters, but may be perfectly normal for more distant nodes. Similar reasoning applies for LQI and level of interference in a given area. As a result, the techniques herein account for the underlying topology of the network, as well as the actual spatial distribution of the nodes. And to deal with the sheer number of parameters that distinguish a normal behavior from a perturbed behavior, the techniques herein provide a much more flexible and powerful approach.

—Input of the LM—

As a result, the LM will take the following data as input (Features):

*Routing topologies: for the sake of illustration, should RPL be used as the routing protocol, the DAG root (FAR) would learn the DAG structure (routing topology) from DAO messages sent by the nodes (or could be part of the routing domain to retrieve the LSDB for OSPF).

*Link characteristics: in the case of LLN such as in the IoT, nodes provide the NMS with updated link metrics via CoAP messages. By inspecting these packets thanks to the techniques such as DPI (Deep Packet inspecting) or a hosted CoAP agent, the LM learns the ETX, RSSI and LQI of each node (eventually detecting perturbations in the network, see hereafter). In non LLN network, the LM may be co-located with a Netflow or SNMPv3 agent.

—Output in the LM—

The output of the LM is a set of dark zones, that is, groups of nodes that are topologically close to each other, and that exhibit some temporary perturbed behavior. In other words, a dark zone is an area where the network is of poor quality. Note that, according to this invention the LM will capture temporary phenomena that would not be captured by a distributed routing protocol slowly adjusting routing metric for example. Hereafter, the techniques herein write S the set of nodes in a dark zone.

—Algorithm—

A simple, yet powerful class of algorithms called Naive Bayes (NB) classifiers is used in the techniques herein (see FIG. 6 for an illustration of an NB classifier). Notably, NB classifiers estimate the distribution of each feature independently. For instance, in FIG. 6, a Gaussian distribution is utilized. Note how the distribution of Feature 1 is centered only on normal samples. This is because a robust estimation method is being used. That is, the estimation method being used is not biased by the outliers present in the dataset, by opposition with simple maximum likelihood estimates.

The strength of NB classifiers is their simplicity and their low computational cost, but also, and most importantly, the fact that they deliver continuous posterior probabilities for each feature, thereby allowing for a straightforward root cause analysis. Indeed, when a node i, characterized by an input vector xi in a N-dimensional state space (N being the number of characteristics of a node), is classified as an anomaly (that is, it is not accepted by any classifier in our system), one can compute the posterior probability P(C|xi,j) where C is the target class and xi,j is the j-th feature of the node i. Because the techniques herein assume independence of the features, the posterior probability of the class C given the whole input vector is:

$$P(C|xi) \sim P(C)*P(xi,1|C)*P(xi,2|C)* \ldots *P(xi,N|C). \quad \text{(Eq. 1)}$$

The advantage is that the probability distribution of each features can be learned and evaluated independently, thereby providing an insight into which feature is making a particular node i an outlier. In particular, the likelihood P(xi,j|C) of each feature j is learned directly from the dataset, typically by using maximum likelihood estimation, and this can be done independently from other features.

NB classifiers are so-called supervised methods, because they require a labeled dataset for training. One of the main challenges lies in gathering such datasets, as the techniques herein don't want the user to go through a huge list of state vectors x and assess whether a given link is in a normal or perturbed state. As a result, the techniques herein recourse to a method whereby they train a single classifier on the whole dataset, even though the latter may contain some perturbed links, which act as outliers in the training set. Fortunately, by using robust estimation methods such as Minimum Covariance Determinant estimator instead of maximum likelihood estimation for estimating the probability distributions P(xi, j|C), the classifier will capture the statistical properties of the normal links only (assuming that perturbed links are considerably less frequent than normal links). Now, it is sufficient to set a threshold PT on the probability P(C|xi) to detect perturbed nodes: if a node i has a probability P(C|xi)<PT, then it is most likely perturbed in some way. As a rule of thumb, PT should be in the same order of magnitude than the proportion of outliers found in the training set. Alternatively, one may consider P(C|xi) as a normality score for the node i. In other words, what becomes necessary is to provide the proportion of outliers found in a given dataset, knowing that NB has trained on another dataset.

In a second phase, the techniques herein identify clusters of perturbed nodes that could form a dark zone. The usual approach to achieve this is a clustering algorithm, which takes a set D={x1, x2, . . . , xM} of M unlabeled points in a N-dimensional state space, and assign them a label in the set C={c1, c2, . . . , cK} such that the points with a given label ci are close to each other according to some distance metric (e.g., the Euclidean distance). In other words, each label forms a cluster of points in some topological space. Now, in this case, the techniques herein account for the relative topological and spatial arrangement of the nodes, as well as their normality score P(C|xi).

To discover dark zones, the techniques herein construct the connectivity graph G=(V,E) whose vertices V are the nodes in the network, and edges E denote connectivity at the L2 layer (see FIG. 7). Each edge is weighted according to the following logistic equation:

$$w(i,j)=1/(1+\exp[P(C|xi)-PT])/(1+\exp[P(C|xj)-PT]) \quad \text{(Eq. 2)}$$

The weight w(i,j) given by Eq. (2) lies in the [0;1] interval for any value of P(C|xi) and P(C|xj), and it is close to zero as either of the normality scores gets above PT. As a result, w(i,j) is close to one if and only if the link connects to nodes suffering from is perturbations.

Based on this graph G, one may then determine the various dark zones that are present in the network by using tools from network science, and in particular algorithms for community (or cluster) detection such as modularity-based methods, clique percolation methods or divisive methods. Each non-trivial community (that is, whose size is larger than a handful of nodes) discovered by the algorithm on the co-occurrence graph forms a dark zone. When using more elaborate algorithms for community detection, the techniques herein rather try to identify groups of densely connected nodes, but the various communities are not necessarily completely disconnected from each other.

An approach for guiding the merging process is the concept of modularity. The modularity is the number of edges falling within groups (i.e., edges whose source and destination belong to the same group), minus the expected number in an equivalent network (that is, with the same group structure), but with edges placed at random. When modularity is positive, it indicates the presence of community structures, and when it is negative, it indicates the lack of such structures. Therefore, any clustering algorithm shall increase the modularity, which the techniques herein will note Q hereafter.

Note in particular that the graph G is weighted (see FIG. 7), and therefore the techniques herein use methods that can deal with weighted networks. Some notably efficient algorithms exist for clustering very large weighted graphs (up to tens of thousands nodes). In particular, one known technique introduces a simple greedy algorithm in $O(n2)$ with n the number of nodes, which starts with as many communities as there are nodes in the network, and then simply merges communities such that the increase in modularity is maximized (or the decrease in modularity is minimized). Doing so, the algorithm constructs a sequence of (n−1) community structures, from which it picks the one that maximizes the modularity Q.

It is worth noting that a dark zone may appear at any time (arising from network conditions or environmental causes), which is precisely the reason why a dynamic detection even capturing temporary phenomena and identification of dark zones is so critical for a proper mode of operation of the network. A permanent dark zone is not problematic since the distributed routing protocol would easily avoid such nodes. What makes the issue of sporadic dark zones so critical is the ability of the LM to detect these zones by correlating many data and quickly make decisions so as to avoid poor network performances. It worth re-enforcing that an objective if the techniques herein is to detect a temporary dark (abnormal set of spatial correlated nodes) that would be poorly handled by the distributed routing protocol using under-reacting routing metrics. Once again, should a dark be persistent, the routing protocol would increase the routing metric to slowly adapt the routing topology and converge to a more optimal state.

Should the LM not be co-located with the Engine collecting the required information used as input for the LM, the techniques herein specify a newly defined unicast IPv6 such as a CoAP message sent by the FAR (collecting input features such as the network topology, GPS location, L2 topology, Link quality) to the LM, and a newly defined reply unicast IPv6 message sent to FAR by the LM.

The second component of the techniques herein consists in running a local simulation of the routing topology computed by the routing protocol on the FAR (or a PCE of some form), should the identified faulty nodes and links be removed from the topology:

Step-1: remove all links Li and node Ni in the list S (recall that S is the set of nodes that were marked as member of a dark zone by the LM) from the topology database.

Step-2: run the distributed routing protocol locally on the FAR/PCE from the perspective of each node in the network and determine 1) the set of disconnected nodes, 2) the path cost increase. Indeed, by reducing connectivity (removing links/nodes), some nodes may get disconnected, and path cost will unavoidably get increased for some nodes.

Step-3: use an iterative process to adjust the set S so as to 1) bound the path cost increase and (optionally) limit the set of disconnected (see below). Note that such a hierarchy of constraints is not NP-complete and could easily be performed on the FAR or a lightweight PCE.

The third component of the techniques herein consists in sending a message to each node in the set S requesting to act as a leaf node, which in the example of RPL can be done by setting its rank to INFINITE_RANK (poisoning technique), or in the case of ISIS setting the Overload bit of the ISIS LSP. Optionally, a newly defined TLV may be specified in the message sent by the FAR to the node in the set S with an indication of time ("avoid the node for X second after receiving the message or after a start time"), that TLV being carried within the routing protocol.

If the message is a simple indication ("node is part of a dark zone"), the FAR may illustratively use a bloom filter (or other compression technique) and send a multicast message instead of a set of unicast message, especially if the number of nodes in the dark zone is large, so as to compress the message and avoid a series of unicast messages.

At this point, each node in the network would quickly get an indication to rerun their best next hop selection (parent selection), thus avoiding the dark zone, unless there is no other choice: indeed, a node may decide to select a node in a dark zone if there is no other path available, as a last resort. In another embodiment, the node in the set S may provide an upper path cost increase bound B in addition to the time. For example, it may avoid this node unless alternate paths imply a path cost increase greater than current_path_cost*B. As mentioned previously, Dark Zones are not permanent, so in the worst case even if a node has to select a parent in the Dark Zone, this condition will be temporary.

The fourth component of the techniques herein consists in triggering passive monitoring of dark zones. Indeed, by provoking the rerouting of traffic around dark zone, very low traffic would traverse a dark zone, leading to no information about the states of the nodes and links in the dark zone. To avoid such a situation, when informed by the FAR that a node is in a dark zone, the nodes start generating low-priority traffic (according to a pre-configured or dynamically determined profile) monitoring traffic destined to the FAR. For example, a node N in a dark zone may start sending low priority traffic to the FAR in order to keep computing the link quality that is itself used by the LM to determine whether the node is in a dark zone.

The LM would keep analyzing the presence of dark zones and would dynamically adjust the set S, which may at some point be an empty list. A newly defined message is specified so as to indicate to a node that it no longer belongs to a dark zone, which would trigger a routing advertisement by the node and clear the "quarantine" state for the node, which is no longer a dark zone. Alternatively the FAR may wait until the expiration of the duration that was potentially reported to the node in the first place.

Figure 8:
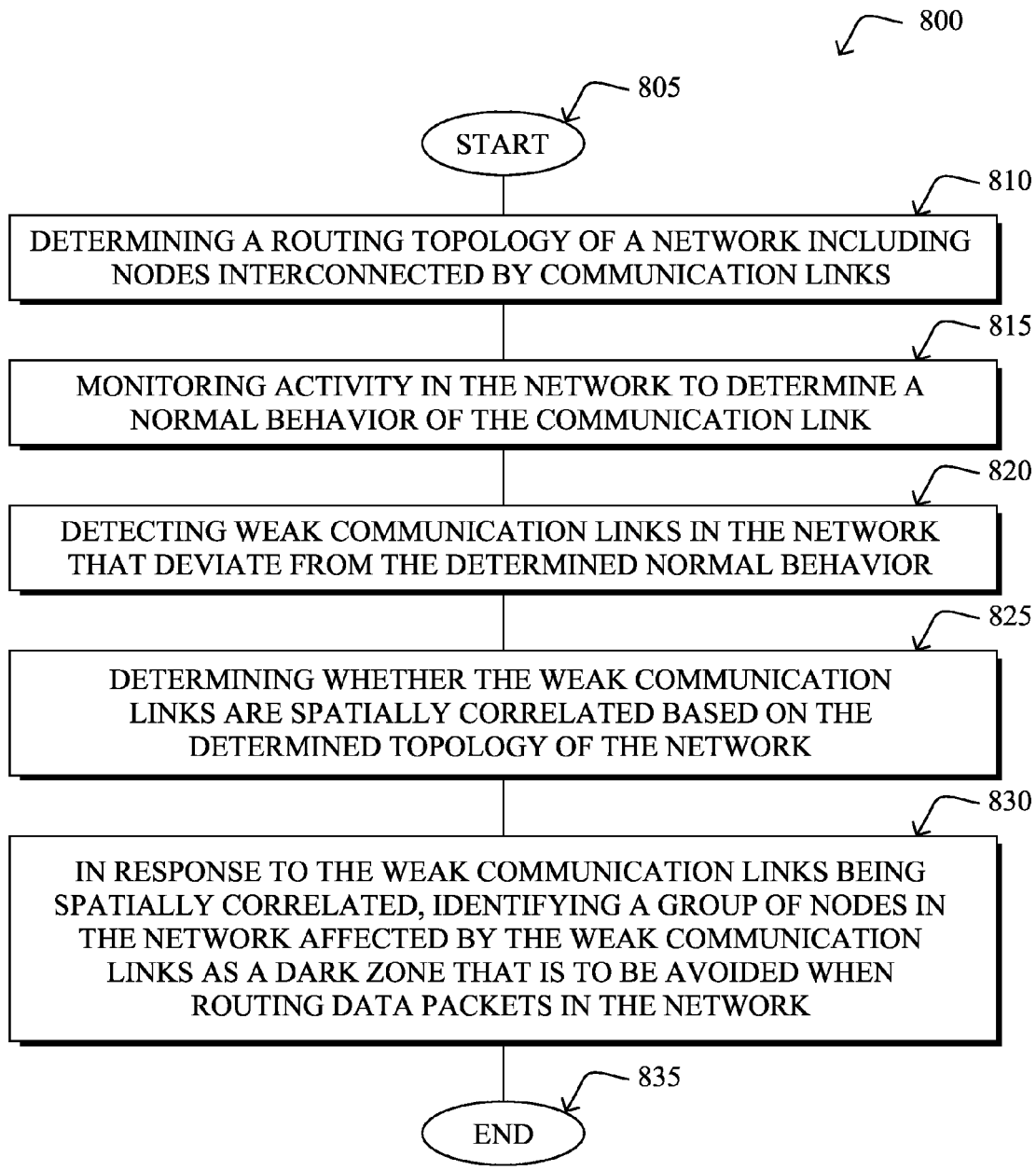
FIG. 8 illustrates an example simplified procedure for mixed distributed/centralized routing techniques based on closed-loop feedback from a learning machine to avoid dark zones in a network.

FIG. 8 illustrates an example simplified procedure for mixed distributed/centralized routing techniques based on closed-loop feedback from a learning machine to avoid dark zones in a network. The procedure 800 may start at step 805, continue to step 810, and so forth.

At step 810, a routing topology of a network including nodes interconnected by communication links is determined. At step 815, activity in the network is monitored to determine a normal behavior of the communication links. At step 820, weak communication links in the network that deviate from the determined normal behavior are detected. Then, at step 825, it is determined whether the weak communication links are spatially correlated based on the determined topology of the network. At step 830, in response to the weak communication links being spatially correlated, a region of the network affected by the weak communication links is identified as a dark zone that is to be avoided when routing data packets in the network. The procedure 800 may illustratively end at step 835. The techniques by which the steps of procedure 800 may be performed, as well as ancillary procedures and parameters, are described in detail above.

It should be noted that the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a mixed distributed/centralized routing technique based on closed-loop feed-back from a learning machine to avoid dark zones in LLNs. In particular, the techniques herein dynamically identify a zone that should be avoided thanks to central analysis of a set of events. This allows the routing protocol to be reactive and locally rerouted traffic, thus dramatically improving the network performance still while using a simple distributed routing protocol.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for learning-machine-based predictive and proactive computer networking and associated monitoring, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining a routing topology of a network including nodes interconnected by communication links;
    monitoring activity in the network to determine a normal behavior of the communication links;
    detecting weak communication links in the network that deviate from the determined normal behavior;
    determining whether the weak communication links are spatially correlated based on the determined topology of the network;
    in response to the weak communication links being spatially correlated, identifying a region of the network affected by the weak communication links as a dark zone that is to be substantially avoided when routing data packets in the network;
    identifying one or more nodes in the network substantially within the dark zone; and
    sending an instruction to the one or more nodes to locally reroute a data packet received by the one or more nodes, such that the dark zone is substantially avoided when forwarding the data packet.

2. The method as in claim 1, further comprising:
    adjusting the routing topology such that the dark zone is substantially avoided when routing data packets in the network.

3. The method as in claim 1, further comprising:
    removing a set of communication links and nodes substantially within the dark zone from a routing topology database; and
    computing, based on the set of removed communication links and nodes, one or more of a set of disconnected nodes and a path cost increase.

4. The method as in claim 3, further comprising:
    modifying the set of removed communication links and nodes so as to limit the path cost increase.

5. The method as in claim 3, further comprising:
    modifying the set of removed communication links and nodes so as to limit the set of disconnected nodes.

6. The method as in claim 1, further comprising:
    receiving a low-priority packet from one of the one or more nodes; and
    determining whether the dark zone is still active based on the received packet.

7. The method as in claim 1, further comprising:
    determining a path cost increase limit for the one or more nodes when locally rerouting the data packet; and
    including an indication of the path cost increase limit in the instruction.

8. The method as in claim 1, further comprising:
    determining an amount of time for which the weak communication links deviate from the determined normal behavior.

9. The method as in claim 1, further comprising:
    monitoring activity of each communication link in the network.

10. The method as in claim 1, wherein the weak communication links are characterized by an abnormally low performance metric, the performance metric relating to one or more of an expected transmission count (ETX), a received signal strength index (RSSI), and a link quality index (LQI).

11. An apparatus, comprising:
    one or more network interfaces that communicate with a network;
    a processor coupled to the one or more network interfaces and configured to execute a process; and
    a memory configured to store program instructions which contain the process executable by the processor, the process comprising:
        determining a routing topology of the network including nodes interconnected by communication links;
        monitoring activity in the network to determine a normal behavior of the communication links;
        detecting weak communication links in the network that deviate from the determined normal behavior;
        determining whether the weak communication links are spatially correlated based on the determined topology of the network;
        in response to the weak communication links being spatially correlated, identifying a region of the network affected by the weak communication links as a dark zone that is to be substantially avoided when routing data packets in the network;
        identifying one or more nodes in the network substantially within the dark zone; and
        sending an instruction to the one or more nodes to locally reroute a data packet received by the one or more nodes, such that the dark zone is substantially avoided when forwarding the data packet.

12. The apparatus as in claim 11, wherein the process further comprises:
    adjusting the routing topology such that the dark zone is substantially avoided when routing data packets in the network.

13. The apparatus as in claim 11, wherein the process further comprises:
    removing a set of communication links and nodes substantially within the dark zone from a routing topology database; and
    computing, based on the set of removed communication links and nodes, one or more of a set of disconnected nodes and a path cost increase.

14. The apparatus as in claim 13, wherein the process further comprises:
    modifying the set of removed communication links and nodes so as to limit the path cost increase.

15. The apparatus as in claim 13, wherein the process further comprises:
    modifying the set of removed communication links and nodes so as to limit the set of disconnected nodes.

16. The apparatus as in claim 11, wherein the process further comprises:
    receiving a low-priority packet from one of the one or more nodes; and determining whether the dark zone is still active based on the received packet.

17. The apparatus as in claim 11, wherein the process further comprises:
  determining a path cost increase limit for the one or more nodes when locally rerouting the data packet; and
  including an indication of the path cost increase limit in the instruction.

18. The apparatus as in claim 11, wherein the process further comprises:
  determining an amount of time for which the weak communication links deviate from the determined normal behavior.

19. The apparatus as in claim 11, wherein the process further comprises:
  monitoring activity of each communication link in the network.

20. The apparatus as in claim 11, wherein the weak communication links are characterized by an abnormally low performance metric, the performance metric relating to one or more of an expected transmission count (ETX), a received signal strength index (RSSI), and a link quality index (LQI).

21. A tangible non-transitory computer readable medium storing program instructions that cause a computer to execute a process, the process comprising:
  determining a routing topology of a network including nodes interconnected by communication links;
  monitoring activity in the network to determine a normal behavior of the communication links;
  detecting weak communication links in the network that deviate from the determined normal behavior;
  determining whether the weak communication links are spatially correlated based on the determined topology of the network;
  in response to the weak communication links being spatially correlated, identifying a region of the network affected by the weak communication links as a dark zone that is to be substantially avoided when routing data packets in the network;
  identifying one or more nodes in the network substantially within the dark zone; and
  sending an instruction to the one or more nodes to locally reroute a data packet received by the one or more nodes, such that the dark zone is substantially avoided when forwarding the data packet.

* * * * *